US012037957B1

(12) United States Patent
Hasegawa

(10) Patent No.: US 12,037,957 B1
(45) Date of Patent: Jul. 16, 2024

(54) CONTROLLER FOR INTERNAL COMBUSTION ENGINE

(71) Applicant: TOYOTA JIDOSHA KABUSHIKI KAISHA, Toyota (JP)

(72) Inventor: Kazuhiro Hasegawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/446,474

(22) Filed: Aug. 9, 2023

(30) Foreign Application Priority Data

Feb. 6, 2023 (JP) ................................ 2023-015982

(51) Int. Cl.
*F02D 41/22* (2006.01)
*F02D 41/00* (2006.01)
*F02D 41/14* (2006.01)

(52) U.S. Cl.
CPC ....... *F02D 41/222* (2013.01); *F02D 41/0002* (2013.01); *F02D 41/1439* (2013.01); *F02D 41/1454* (2013.01)

(58) Field of Classification Search
CPC ............... F02D 41/222; F02D 41/0002; F02D 41/1439; F02D 41/1454
See application file for complete search history.

(56) References Cited

U.S. PATENT DOCUMENTS

2009/0288391 A1* 11/2009 Aoki .................. F01N 13/0093 123/704

FOREIGN PATENT DOCUMENTS

JP 2009156106 A 7/2009
JP 2009209861 A 9/2009
JP 2019183672 A 10/2019

* cited by examiner

*Primary Examiner* — Grant Moubry
*Assistant Examiner* — Ruben Picon-Feliciano

(57) ABSTRACT

A controller for an internal combustion engine is provided. A control circuit performs active control for an air-fuel ratio of exhaust gas. During execution of the active control, an increasing process for increasing an intake air amount is executed. During execution of the active control, a cumulated intake air amount is calculated. A sensor detects the air-fuel ratio. It is determined whether an anomaly has occurred in the sensor during execution of the active control. A maximum execution period of a sensor diagnostic process is set to a period for the cumulated intake air amount to reach a specified threshold value. The increasing process is prohibited during the execution of the sensor diagnostic process.

11 Claims, 3 Drawing Sheets

CONTROLLER FOR INTERNAL COMBUSTION ENGINE

BACKGROUND

1. Field

The present disclosure relates to a controller for an internal combustion engine.

2. Description of Related Art

Japanese Laid-Open Patent Publication No. 2019-183672 discloses an example of an internal combustion engine that includes a catalyst and a filter that are located in an exhaust passage. The filter is regenerated by performing active control for enriching an air-fuel ratio and performing an increasing process for an intake air amount. A diagnostic process that determines whether the catalyst has deteriorated is performed during execution of the active control.

The internal combustion engine disclosed in Japanese Laid-Open Patent Publication No. 2009-209861 includes a sensor located downstream of the catalyst. This sensor detects the air-fuel ratio of exhaust gas. The diagnostic process determines whether an anomaly has occurred in the sensor based on a change in a detection value of the sensor during execution of the active control.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a controller for an internal combustion engine. The controller includes control circuitry configured to execute active control for an air-fuel ratio of exhaust gas, execute an increasing process that increases an intake air amount during execution of the active control, calculate a cumulated intake air amount during the execution of the active control, the cumulated intake air amount being a cumulated value of the intake air amount, detect the air-fuel ratio using a sensor, a catalyst being disposed in an exhaust passage of the internal combustion engine, and the sensor is located downstream of the catalyst, execute a sensor diagnostic process that determines whether an anomaly has occurred in the sensor during the execution of the active control, set a maximum execution period of the sensor diagnostic process to a period for the cumulated intake air amount to reach a specified threshold value, and prohibit the increasing process during execution of the sensor diagnostic process.

The configuration limits a decrease in the accuracy of diagnosing an anomaly in the sensor.

When the diagnostic process for the sensor is executed, the execution period of the diagnostic process may be set to a period for the cumulated intake air amount calculated during the execution of the active control to reach the specified threshold value. If the increasing process for the intake air amount is executed in this case, the cumulated intake air amount reaches the specified threshold value in a shorter period of time. When the cumulated intake air amount reaches the specified threshold value in a shorter period of time, the diagnostic process for the sensor is executed for a shorter period of time. When the diagnostic process for the sensor is executed for a shorter period of time, it is difficult to provide the time required for the diagnosis on the sensor. Thus, the accuracy for diagnosing an anomaly in the sensor may decrease. The above configuration reduces such a risk.

Other features and aspects will be apparent from the following detailed description, the drawings, and the claims.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, an embodiment of a controller for an internal combustion engine will be described with reference to FIGS. 1 to 3.

Configuration of Internal Combustion Engine, Driving System, and Controller

Figure 1:
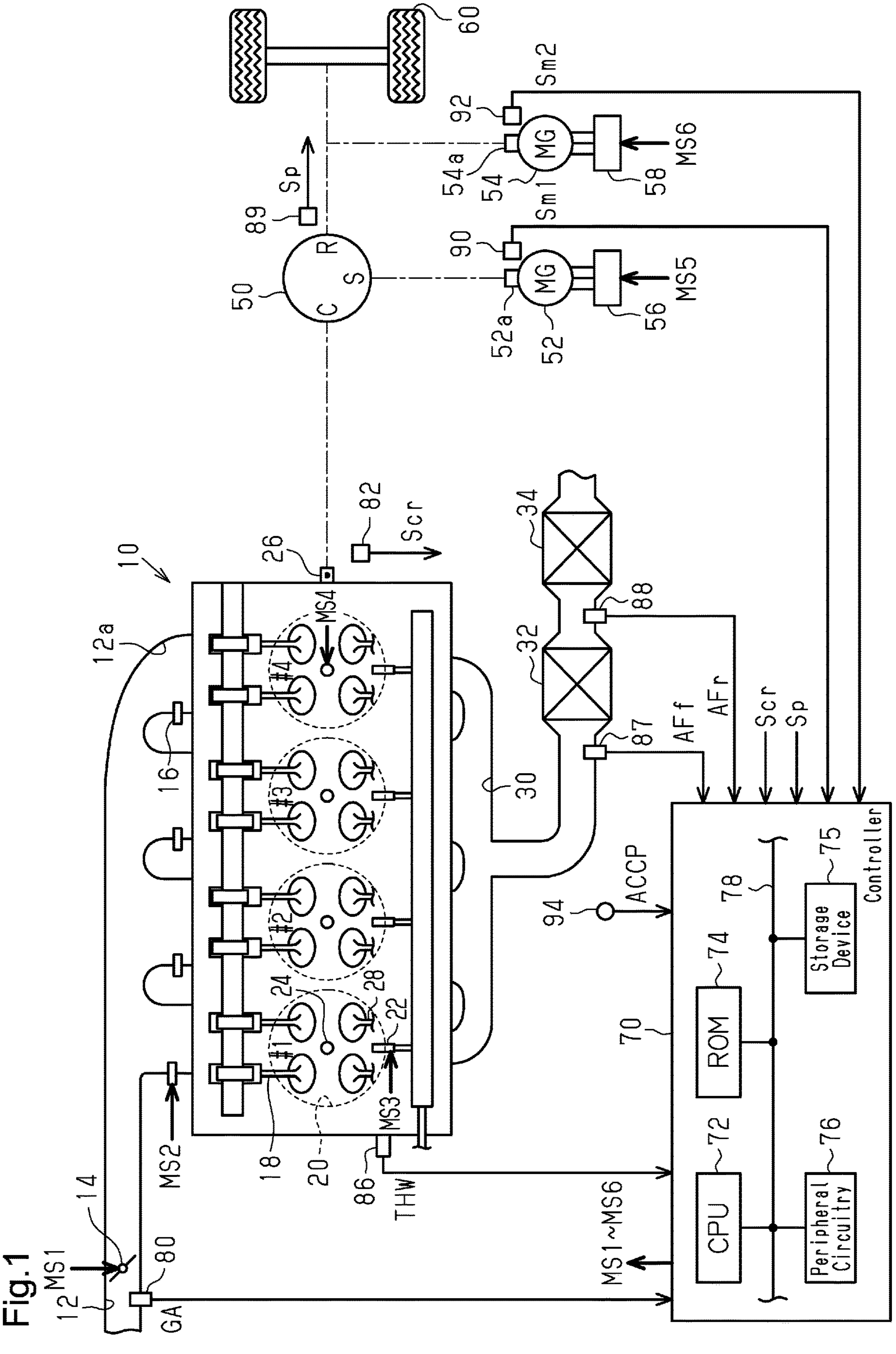
FIG. 1 is a schematic diagram showing the configuration of an internal combustion engine, a driving system, and a controller according to an embodiment.

As shown in FIG. 1, the internal combustion engine 10 includes, for example, four cylinders #1 to #4. The internal combustion engine 10 includes an intake passage 12 provided with a throttle valve 14. An intake port **12*a* at a downstream portion of the intake passage 12 includes port injection valves 16. Each of the port injection valves 16 injects fuel into the intake port 12*a*. The air drawn into the intake passage 12 and the fuel injected from the port injection valves 16 flow into combustion chambers 20 as intake valves 18 open. Fuel is injected into the combustion chambers 20 from direct injection valves 22. The air-fuel mixtures of air and fuel in the combustion chambers 20 are burned by spark discharge of ignition plugs 24. The generated combustion energy is converted into rotation energy of a crankshaft 26**.

When exhaust valves 28 open, the air-fuel mixtures burned in the combustion chambers 20 are discharged to an exhaust passage 30 as exhaust gas. A three-way catalyst 32 having an oxygen storage capacity is provided in the exhaust passage 30. When combustion is performed around the stoichiometric air-fuel ratio, the catalyst 32 oxidizes HC and CO in the exhaust gas and reduces NOx in the exhaust gas, thereby purifying the exhaust gas. A filter 34 that traps particulate matter in the exhaust gas is provided downstream of the catalyst 32. The filter 34 of the present embodiment carries a catalyst for purifying exhaust gas.

A first air-fuel ratio sensor 87 is provided upstream of the catalyst 32. The first air-fuel ratio sensor 87 is detects an upstream air-fuel ratio AFf that is the air-fuel ratio of the exhaust gas flowing into the catalyst 32. Further, a second air-fuel ratio sensor 88 is provided downstream of the catalyst 32. The second air-fuel ratio sensor 88 detects a downstream air-fuel ratio AFr that is the air-fuel ratio of the exhaust gas after passing through the catalyst 32.

The first air-fuel ratio sensor 87 and the second air-fuel ratio sensor 88 are known limiting current type oxygen sensors. This limiting current type oxygen sensor is capable of obtaining an output current corresponding to the oxygen concentration in exhaust gas by providing a ceramic layer called a diffusion rate limiting layer in the detecting portion of the concentration cell oxygen sensor. When the air-fuel ratio closely related to the oxygen concentration in the exhaust gas is the stoichiometric air-fuel ratio, the output current of the limiting current type oxygen sensor becomes 0. Further, since the output current increases in the negative direction as the air-fuel ratio becomes richer, the output current increases in the positive direction as the air-fuel ratio becomes leaner. Thus, the lean degree and the rich degree of the air-fuel ratio can be detected based on the outputs of the first air-fuel ratio sensor 87 and the second air-fuel ratio sensor 88.

The crankshaft 26 is mechanically coupled to a carrier C of a planetary gear mechanism 50, which is included in a power split device. A first rotary shaft 52*a* of a first motor generator 52 is mechanically coupled to a sun gear S of the planetary gear mechanism 50. Further, a rotary shaft 54*a* of a second motor generator 54 and driven wheels 60 are mechanically coupled to a ring gear R of the planetary gear mechanism 50. A first inverter 56 applies alternating-current voltage to a terminal of the first motor generator 52. A second inverter 58 applies alternating-current voltage to a terminal of the second motor generator 54.

The controller 70 is a control circuit that controls the internal combustion engine 10. In order to control the controlled variables of the internal combustion engine 10 (e.g., torque or exhaust component ratio), the controller 70 operates operation units of the internal combustion engine 10 such as the throttle valve 14, the port injection valves 16, the direct injection valves 22, and the ignition plugs 24. Since the controller 70 controls the first motor generator 52, the controller 70 operates the first inverter 56 in order to control the rotation speed (controlled variable) of the first motor generator 52. Since the controller 70 controls the second motor generator 54, the controller 70 operates the second inverter 58 in order to control torque (controlled variable) of the second motor generator 54. FIG. 1 shows operation signals MS1 to MS6 that correspond to the throttle valve 14, the port injection valves 16, the direct injection valves 22, the ignition plugs 24, the first inverter 56, and the second inverter 58, respectively.

To control the controlled variables of the internal combustion engine 10, the controller 70 refers to an intake air amount GA detected by an air flow meter 80 and an output signal Scr of a crank angle sensor 82. Further, the controller 70 refers to the temperature of the coolant (coolant temperature THW) in the internal combustion engine 10, which is detected by a water temperature sensor 86. Furthermore, the controller 70 refers to the upstream air-fuel ratio AFf, which is detected by the first air-fuel ratio sensor 87, and the downstream air-fuel ratio AFr, which is detected by the second air-fuel ratio sensor 88. Additionally, the controller 70 refers to an output signal Sp of an output-side rotation angle sensor 89 that detects a rotation angle of the ring gear R. In order to control the controlled variables of the first motor generator 52, the controller 70 refers to an output signal Sm1 of a first rotation angle sensor 90 that detects the rotation angle of the first motor generator 52. In order to control the controlled variables of the second motor generator 54, the controller 70 refers to an output signal Sm2 of a second rotation angle sensor 92 that detects the rotation angle of the second motor generator 54. Further, the controller 70 refers to an accelerator operation amount ACCP, which is the depression amount of an accelerator pedal detected by an accelerator sensor 94.

The controller 70 calculates the engine rotation speed NE based on the output signal Scr of the crank angle sensor 82. Further, the controller 70 calculates an engine load factor KL based on the engine rotation speed NE and the intake air amount GA. The engine load factor KL represents the ratio of the current cylinder inflow air amount to the cylinder inflow air amount when the internal combustion engine 10 is steadily operated in a full load state. The cylinder inflow air amount is the amount of air that flows into each cylinder in the intake stroke. The controller 70 calculates a vehicle speed SP of a vehicle, on which the internal combustion engine 10 is mounted, based on the output signal Sp of the output-side rotation angle sensor 89.

The controller 70 includes a CPU 72, a ROM 74, a memory device 75, and peripheral circuitry 76. These components are capable of communicating with one another via a communication line 78. The peripheral circuitry 76 includes, for example, a circuit that generates a clock signal regulating operations inside the controller 70, a power supply circuit, and a reset circuit. The controller 70 controls the controlled variables by causing the CPU 72 (processor) to execute programs stored in the ROM 74.

Control and Processes Executed by Controller

The controller 70 performs fuel injection control of the port injection valve 16 and the direct injection valve 22. Also, the controller 70 performs ignition timing control of the ignition plug 24. Further, the controller 70 performs air-fuel ratio control for controlling the air-fuel ratio of the air-fuel mixture to a target air-fuel ratio AFt, which is set based on the engine operating state. Furthermore, the controller 70 calculates a requested torque required for traveling of the vehicle based on the accelerator operation amount ACCP and the vehicle speed SP. Additionally, the controller 70 controls a requested output Pe of the internal combustion engine 10 and output torques of the first motor generator 52 and the second motor generator 54 to satisfy the requested torque of the vehicle.

The controller 70 calculates a deposition amount DPM, which is the amount of particulate matter trapped in the filter 34, based on the engine rotation speed NE, a charging efficiency $\eta$, the coolant temperature THW, and the like. Then, the controller 70 determines whether the deposition amount DPM is greater than or equal to a regeneration execution value DPMH. The value of the regeneration execution value DPMH is set to a value at which removal of particulate matter is desired as a result of an increase in the amount of particulate matter trapped by the filter 34. When determining that the deposition amount DPM is greater than or equal to the regeneration execution value DPMH, the controller 70 performs a regeneration request for requesting execution of regeneration control for removing the trapped particulate matter from the filter 34. When the condition for permitting the execution of the regeneration control is satisfied, the regeneration control is executed.

As this regeneration control, the controller 70 executes, for example, an active control for the air-fuel ratio, an increasing process for the intake air amount, and the like.

The active control for the air-fuel ratio is known. That is, the active control is control for setting the target air-fuel ratio AFt of the air-fuel mixture to an air-fuel ratio richer than the stoichiometric air-fuel ratio. If the air-fuel ratio of the air-fuel mixture is set to an air-fuel ratio richer than the stoichiometric air-fuel ratio, the amount of unburned fuel contained in the combustion gas increases. When the unburned fuel is oxidized in the catalyst 32, the temperature of the exhaust gas rises. When the heated exhaust gas flows into the filter 34, the temperature of the filter 34 rises. When the temperature of the filter 34 rises in this manner the amount of the particulate matter trapped in the filter 34 decreases, the filter 34 is regenerated.

The increasing process for the intake air amount is a process that increases the intake air amount of the internal combustion engine 10 as compared with when the increasing process is not executed. When the intake air amount is increased in this manner, the output of the internal combustion engine 10 increases so that the temperature of the exhaust gas increases. The filter 34 is also regenerated by such an increase in the temperature of the exhaust gas. The increasing process for the intake air amount is executed when a catalyst diagnostic process (described later) determines that no anomaly has occurred in the catalyst 32 and when a sensor diagnostic process (described later) is completed.

The controller 70 calculates a maximum oxygen storage amount Cmax of the catalyst 32 by a known method during execution of the active control. The maximum oxygen storage amount Cmax indicates, for example, the amount of oxygen that can be stored by the catalyst 32. When the calculated maximum oxygen storage amount Cmax is greater than or equal to a specified threshold value, the controller 70 determines that no anomaly has occurred in the catalyst 32. When the maximum oxygen storage amount Cmax is less than the specified threshold value, the controller 70 determines that an anomaly has occurred in the catalyst 32. The controller 70 executes such a catalyst diagnostic process.

Further, during execution of the active control, the controller 70 executes the sensor diagnostic process that diagnoses whether an anomaly has occurred in the second air-fuel ratio sensor 88. In the sensor diagnostic process, a cumulated intake air amount OSA, which is a cumulated value of the intake air amount from the start of the active control, is calculated. Then, if the downstream air-fuel ratio AFr, which is the detection value of the second air-fuel ratio sensor 88, indicates a value richer than the stoichiometric air-fuel ratio in a period for the cumulated intake air amount OSA to reach a specified threshold value OSAref, the controller 70 determines that no anomaly has occurred in the second air-fuel ratio sensor 88. That is, the active control sets the air-fuel ratio of the air-fuel mixture to a value richer than the stoichiometric air-fuel ratio. Thus, if the second air-fuel ratio sensor 88 is normal, the downstream air-fuel ratio AFr becomes richer than the stoichiometric air-fuel ratio. If the downstream air-fuel ratio AFr, which is the detection value of the second air-fuel ratio sensor 88, does not indicate a value richer than the stoichiometric air-fuel ratio in the period for the cumulated intake air amount OSA to reach the specified threshold value OSAref, the controller 70 determines that an anomaly has occurred in the second air-fuel ratio sensor 88. Thus, the sensor diagnostic process is a process that sets the maximum execution period of the sensor diagnostic process to the period for the cumulated intake air amount OSA calculated during the execution of the active control to reach the specified threshold value OSAref. When determining whether an anomaly has occurred in the second air-fuel ratio sensor 88, the controller 70 completes the execution of the sensor diagnostic process.

The specified threshold value OSAref is a value of the cumulated intake air amount OSA that allows an execution time TD of the sensor diagnostic process to be provided without excess or deficiency. The execution time TD of the sensor diagnostic process is required for the controller 70 to detect that an anomaly has occurred in the second air-fuel ratio sensor 88. If the value of the specified threshold value OSAref is extremely small, the execution time TD of the sensor diagnostic process becomes insufficient. If the value of the specified threshold value OSAref is extremely large, the time for the sensor diagnostic process to be completed becomes excessively long. Thus, the specified threshold value OSAref is set to an appropriate value that does not cause such inconvenience.

Procedure for Prohibiting Increasing Process for Intake Air Amount

Figure 2:
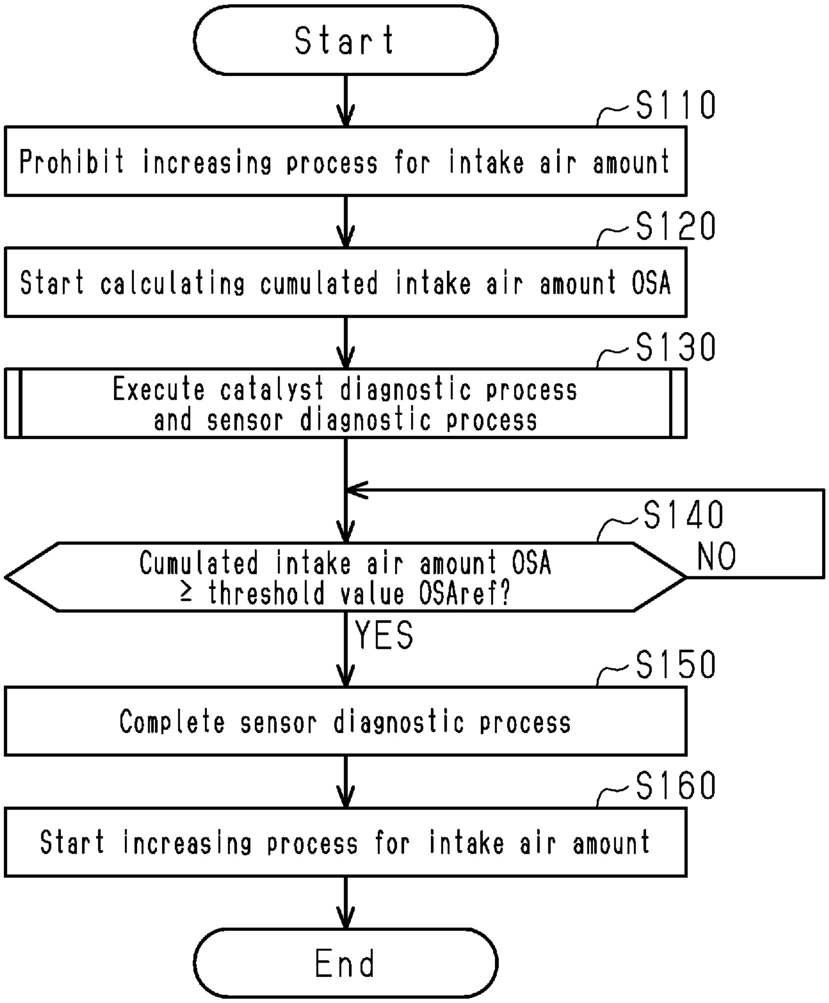
FIG. 2 is a flowchart showing a procedure of the processes executed by the controller shown in FIG. 1.

FIG. 2 shows a procedure executed by the controller 70 for prohibiting the increasing process for the intake air amount described above until the sensor diagnostic process is completed. The processes shown in FIG. 2 are executed by the CPU 72 executing the programs stored in the ROM 74. The controller 70 starts execution of the process shown in FIG. 2 when the active control is being executed and various predetermined execution conditions for permitting execution of the catalyst diagnostic process and the sensor diagnostic process are satisfied. In the following description, the number of each step is represented by the letter S followed by a numeral.

When the series of processes shown in FIG. 2 is started, the controller 70 executes a prohibiting process that prohibits the increasing process for the intake air amount (S110). This is because the active control is being executed.

Next, the controller 70 starts calculation of the cumulated intake air amount OSA (S120).

Next, the controller 70 executes the catalyst diagnostic process and the sensor diagnostic process (S130).

Then, the controller 70 determines whether the cumulated intake air amount OSA is greater than or equal to the specified threshold value OSAref (S140). When determining that the cumulated intake air amount OSA is less than the specified threshold value OSAref, the controller 70 repeatedly executes the process of S140.

When the value of the cumulated intake air amount OSA increases over time and thus the process of S140 determines that the cumulated intake air amount OSA is greater than or equal to the specified threshold value OSAref, the controller 70 completes the execution of the sensor diagnostic process (S150). Then, the controller 70 starts executing the increasing process for the intake air amount that has been prohibited from being executed (S160) to ends the processes.

When the increasing process for the intake air amount is executed in the S160, the output of the internal combustion engine 10 increases. The controller 70 reduces the output torque of the second motor generator 54 by an amount corresponding to such an increase in the output of the internal combustion engine 10, thereby limiting a change in the torque required for traveling of the vehicle.

Operation and Advantages

The operation and advantage of the present embodiment will be described with reference to FIG. 3.

Figure 3:
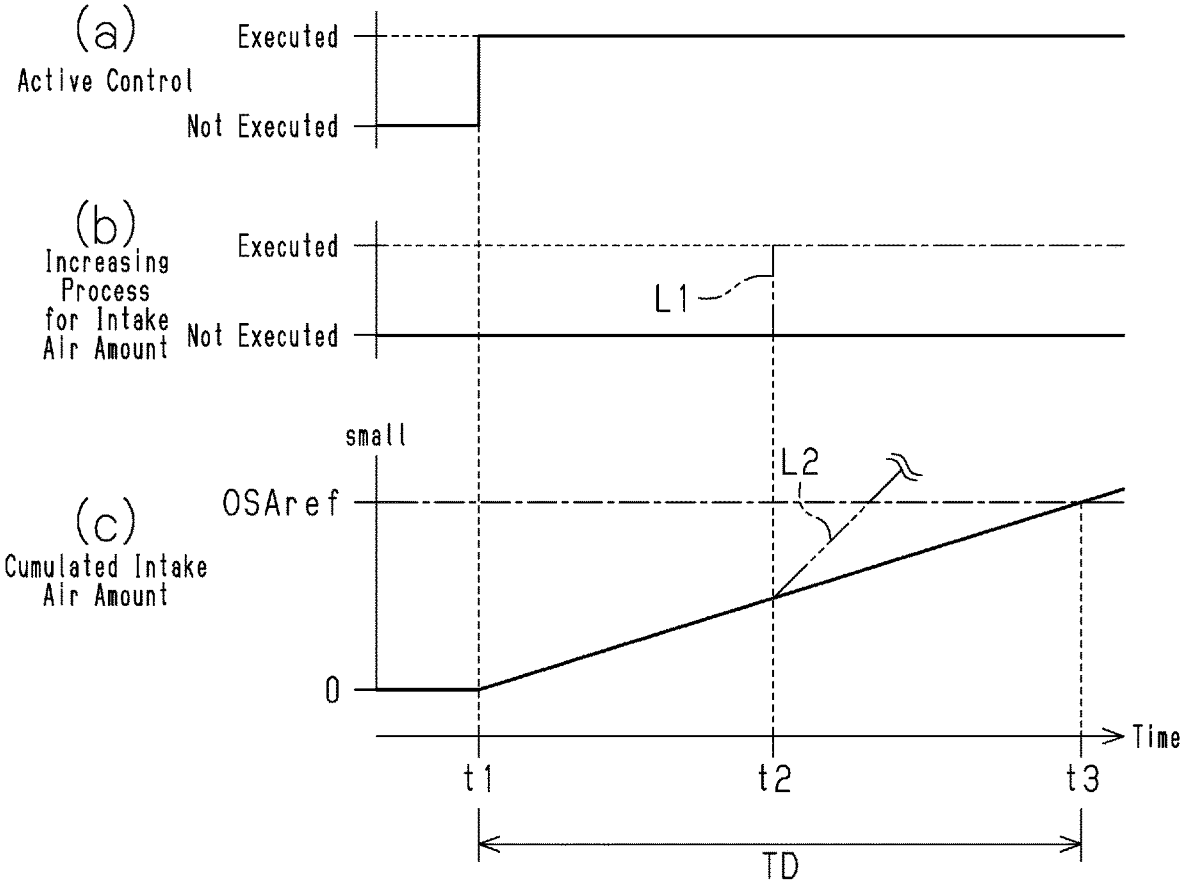
FIG. 3 is a timing diagram showing the operation of the processes shown in FIG. 1, in which section (a) shows the execution state of the active control, section (b) shows the execution state of the increasing process for the intake air amount, and section (c) shows change in the cumulated intake air amount OSA during execution of the active control.

FIG. 3 illustrates changes in various values obtained when the downstream air-fuel ratio AFr, which is the detection value of the second air-fuel ratio sensor 88, does not indicate a value richer than the stoichiometric air-fuel ratio (i.e., when no anomaly has occurred in the second air-fuel ratio sensor 88) during execution of the active control.

Section (a) of FIG. 3 shows the execution state of the active control. Section (b) of FIG. 3 shows an execution state of the increasing process for the intake air amount. Section (c) of FIG. 3 shows changes in the cumulated intake air amount OSA during the active control.

At time t1, when the execution of the active control is started and the execution condition for the catalyst diagnostic process and the sensor diagnostic process are satisfied, the controller 70 starts the processes shown in FIG. 2. As a result, not only the catalyst diagnostic process and the sensor diagnostic process are executed (S130) but also the value of the cumulated intake air amount OSA increases over time.

When the cumulated intake air amount OSA reaches the specified threshold value OSAref at time t3 (S140: YES), the execution of the sensor diagnostic process is completed (S150). In the example of FIG. 3, an anomaly has occurred in the second air-fuel ratio sensor 88. Thus, the downstream air-fuel ratio AFr does not indicate a value richer than the stoichiometric air-fuel ratio from time t1 to time t3 (i.e., during the execution time TD of the sensor diagnostic process). Thus, at time t3, the controller 70 determines that an anomaly has occurred in the second air-fuel ratio sensor 88.

A comparative example will now be described. In this example, the increasing process for the intake air amount is started at time t2, which is during the execution of the sensor diagnostic process, as indicated by a first long dashed double-short dashed line L1 in section (b) of FIG. 3. Then, as indicated by ae second long dashed double-short dashed line L2 in section (c) of FIG. 3, the rate of increase in the cumulated intake air amount OSA rises subsequent to time t2. Thus, the time for the cumulated intake air amount OSA to reach the specified threshold value OSAref becomes relatively short. That is, the sensor diagnostic process may be terminated at a relatively early stage before the execution time TD elapses.

By contrast, in the present embodiment, the increasing process for the intake air amount is prohibited until the sensor diagnostic process is completed (S110). That is, the increasing process for the intake air amount is prohibited during the execution of the sensor diagnostic process (S130). Thus, in the present embodiment, unlike the comparative example indicated by the first long dashed double-short dashed line L1 and the second long dashed double-short dashed line L2, the increasing process for the intake air amount is executed to limit situations in which the cumulated intake air amount OSA reaches the specified threshold value OSAref in a shorter period of time. Hence, unlike the comparative example, the present embodiment limits a decrease in the accuracy of diagnosing an anomaly in the second air-fuel ratio sensor 88 due to a shortened execution period of the sensor diagnostic process.

Modifications

The above embodiment may be modified as follows. The above embodiment and the following modifications can be combined as long as the combined modifications remain technically consistent with each other.

The second air-fuel ratio sensor 88 may be a known concentration cell oxygen sensor. When the air-fuel ratio is richer than the stoichiometric air-fuel ratio, an output of about 1V is obtained from the concentration cell oxygen sensor. When the air-fuel ratio is leaner than the stoichiometric air-fuel ratio, an output of about 0V is obtained. Further, when the air-fuel ratio changes in a value relatively close to the stoichiometric air-fuel ratio, the output voltage of the concentration cell oxygen sensor changes greatly. Thus, the concentration cell oxygen sensor detects whether the air-fuel ratio is lean or rich.

The filter 34 is not limited to a filter carrying a catalyst, and may be only a filter.

The controller is not limited to a device that includes the CPU 72 and the ROM 74 and executes software processing. For example, at least part of the processes executed by the software in the above embodiment may be executed by hardware circuits (such as ASIC) dedicated to executing these processes. That is, the controller may be modified as long as it has any one of the following configurations (a) to (c): (a) a configuration including a processing device as a processor that executes all of the processes described above in accordance with a program, and a program storage device (including a non-transitory computer-readable storage medium) such as a ROM that stores the program; (b) a configuration including a processor and a program storage device that execute part of the above processes according to the programs and a dedicated hardware circuit that executes the remaining processes; and (c) a configuration including a dedicated hardware circuit that executes all of the above processes. There may be multiple software execution devices, each including a processor and a program storage device, and multiple dedicated hardware circuits.

The vehicle is not limited to a series-parallel hybrid electric vehicle and may be, for example, a parallel hybrid electric vehicle or a series hybrid electric vehicle. However, the vehicle is not limited to a hybrid electric vehicle and may be, for example, a vehicle in which only the internal combustion engine 10 is used as a prime mover. When the prime mover of the vehicle is only the internal combustion engine 10, the increase in the output of the internal combustion engine 10 resulting from the execution of the increasing process for the intake air amount may be offset by, for example, increasing drive load on various accessories provided in the internal combustion engine 10.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller for an internal combustion engine, the controller comprising a processor configured to:

execute active control for an air-fuel ratio of exhaust gas;

increase an intake air amount during execution of the active control;

calculate a cumulated intake air amount during the execution of the active control, wherein the cumulated intake air amount is a cumulated value of the intake air amount;

detect the air-fuel ratio using a sensor, wherein a catalyst is disposed in an exhaust passage of the internal combustion engine, and the sensor is located downstream of the catalyst;

execute a sensor diagnostic process that determines whether an anomaly has occurred in the sensor during the execution of the active control;

set a maximum execution period of the sensor diagnostic process to a period for the cumulated intake air amount to reach a specified threshold value; and prohibit increasing the intake air amount during execution of the sensor diagnostic process while executing the active control for the air-fuel ratio of the exhaust gas.

2. The controller according to claim 1, wherein the specified threshold value of the cumulated intake air amount corresponds to a time required for detecting the anomaly in the sensor through the sensor diagnostic process.

3. The controller according to claim 1, wherein the active control enriches the air-fuel ratio to increase a temperature of a filter provided in the exhaust passage.

4. The controller according to claim 3, wherein when the air-fuel ratio is set to be richer than a stoichiometric air-fuel ratio, an amount of unburned fuel contained in combustion gas increases, and then the unburned fuel is oxidized in the catalyst and the temperature of the exhaust gas rises.

5. The controller according to claim 4, wherein when the heated exhaust gas flows into the filter, the temperature of the filter rises, and then the amount of particulate matter trapped in the filter decreases such that the filter is regenerated.

6. The controller according to claim 1, wherein increasing the intake air amount is executed when it is determined that no anomaly has occurred in the catalyst.

7. The controller according to claim 1, wherein increasing the intake air amount is executed when the sensor diagnostic process is completed.

8. The controller according to claim 1, wherein by increasing the intake air amount, an output of the internal combustion engine increases so that the temperature of the exhaust gas increases such that the filter is regenerated by the increase in the temperature of the exhaust gas.

9. The controller according to claim 6, wherein the processor is configured to calculate a maximum oxygen storage amount of the catalyst during execution of the active control, and when the calculated maximum oxygen storage amount is greater than or equal to a specified threshold value, the processor determines that no anomaly has occurred in the catalyst.

10. The controller according to claim 1, wherein if a detection value of the sensor indicates a value richer than a stoichiometric air-fuel ratio in the period for the cumulated intake air amount to reach the specified threshold value, then the processor determines that no anomaly has occurred in the sensor.

11. The controller according to claim 1, wherein a vehicle to which the internal combustion engine is applied includes a motor that provides an output torque for traveling, when the intake air amount is increased, an output of the internal combustion engine increases, and the processor is configured to reduce the output torque of the motor by an amount corresponding to an increase in the output of the internal combustion engine.

* * * * *